Patented Oct. 17, 1939

2,176,088

UNITED STATES PATENT OFFICE 2,176,088

PREPARATION OF HIGH VISCOSITY ORGANIC ACID ESTERS OF CELLULOSE

Carl J. Malm, Rochester, N. Y., assignor, by mesne assignments, to Eastman Kodak Company, Rochester, N. Y., a corporation of New Jersey No Drawing. Application April 7, 1936, Serial No. 73,138

2 Claims. (Cl. 260—225)

The present invention relates to the preparation of high viscosity organic acid esters of cellulose in which the esterification ingredients are selectively cooled before the esterification proper takes place.

In the preparation of organic acid esters of cellulose, for instance cellulose acetate, considerable heat is generated when the cellulose is initially contacted with the organic acid anhydride, due both to the heat generated by the reaction between the moisture present in the cellulose and the anhydride and to the esterification of the cellulose caused by local overheating, especially where an amount of catalyst is employed which will cause the esterification to proceed fairly rapidly. In the preparation of low viscosity esters of cellulose, the heat thus generated aids in raising the temperature and thus lowering the viscosity of the products therein. In the preparation of high viscosity esters of cellulose on the other hand, the heat initially generated in the esterification process constitutes a serious problem, due to its tendency to carry the temperature to a point where the reaction gets out of control and low viscosity esters result. One way of avoiding too rapid an elevation of the temperature is by employing a relatively small amount of catalyst in the esterification bath. However, this slows up the reaction between the anhydride and the cellulose and the cellulose will be degraded before it has sufficient combined acyl to protect it from further degrading action of the catalyst. I prefer to use 5–10% of sulphuric acid based upon the weight of the cellulose.

Cooling of the reaction mixture prior to contacting with the cellulose had been proposed, however, this procedure offers the disadvantage that it precludes the pretreatment of cellulose prior to its esterification which is necessary in order to obtain a satisfactory high viscosity product. The suggestions, in the prior art, of cooling the complete reaction mixture before adding it to the cellulose are quite old yet this procedure has never been developed or used to any extent commercially due probably to this disadvantage.

It has also been suggested to crystallize the acetic acid at the end of the pretreatment before the addition of the anhydride. This is an extremely slow procedure due to the comparatively small cooling surface of an esterification vessel and the tendency of the crystals to form on the cooling surface thus lowering its heat conductivity. Also it is very difficult to control the reaction after the addition of the anhydride and to judge how the reaction is proceeding due to the impossibility of determining the rate at which the acetic acid crystals are melting.

An object of the present invention is to provide a process for the preparation of organic acid esters of cellulose in which sufficient catalyst is employed to cause the esterification to proceed with satisfactory speed and yet in which the cellulose is not detrimentally affected either by the presence of this large amount of catalyst or by the heat generated when the cellulose is contacted with the acetic anhydride. I have found that high viscosity organic acid esters of cellulose may be prepared in an economical manner and yet sufficient catalyst to cause completion of the esterification in a reasonable time is used. If the esterification ingredients, besides acetic acid, are refrigerated to an extremely low temperature and the mixture of these refrigerated ingredients is then added to the cellulose, which has been presoaked with the acetic acid, the esterification goes well and a cellulose ester of high viscosity results. I have found that it is preferable to cool the mixture of acetic acid and cellulose at the end of the pretreatment to a point above that at which the acid will crystallize prior to contacting with the refrigerated esterification ingredients. By employing this procedure the temperature is easily controlled and the cellulose will retain its high viscosity rather than being detrimentally affected by any of the reaction ingredients.

It is preferred in the preparation of the high viscosity esters of cellulose that the cellulose be given a preliminary soaking or treatment with a bath composed mainly of acetic acid to render it more uniformly susceptible to the action of the esterifying ingredients. If desired, however, the cellulose might be pretreated with a mixture of organic acids such as acetic and propionic or acetic and butyric acids.

If desired, the mixture of esterifying ingredients, such as of propionic acid and acetic anhydride and the catalyst may be allowed to stand for a time such as 4 hours at ordinary temperature, or less if at an elevated temperature, prior to their refrigeration. This procedure has been found to result in an increase of a few percent in the percentage of propionyl in the product over that obtained without the long standing. This is also true in the case of the butyrates. As pointed out herein the mixture of esterifying ingredients may vary as to composition and any of these may be allowed to stand and accomplish the stated result.

A preferred manner of preparing high viscosity organic acid esters of cellulose embodying my invention is as follows:

The cellulose is presoaked in a substantial amount of glacial acetic acid at approximately 100° F. for about 3½ or 4 hours. In the meantime the lower fatty acid anhydride or anhydrides, the catalyst and, if desired, some lower fatty acid other than acetic, are mixed together and refrigerated, for instance to a temperature of approximately 10° F. The ingredients all remain liquid and are easily cooled down to this temperature. After the presoaking has occurred, the mass of acid and cellulose is cooled to a temperature at which the acid will not crystallize, such as 65°–70° F., or lower if propionic or butyric acid is used with the acetic acid. The refrigerated esterifying mixture is then added to this cooled mass thereby inducing esterification. It is preferred also to apply external cooling at this point and throughout the first part of the esterification. This external cooling may be by means of a water jacket, surrounding the reaction vessel. The maximum temperature permissible will ordinarily be 90° F. or even 80° F., the sole criterion being that it is not high enough to result in a material reduction in viscosity.

When the esterifying mixture is added to the presoaked cellulose, considerable heat is generated due to the reaction between the anhydride and the moisture present and to the beginning of the esterification. Nevertheless the reaction does not go out of control and the temperature does not rise to a point at which the cellulose is affected because of the taking up of heat by the refrigerated materials and consequently the temperature remains low and a high viscosity product results.

This process has the advantage that as soon as the cellulose has completed its presoaking, it need only be cooled to a slight extent, as indicated, prior to the addition of the refrigerated ingredients and thereby considerable time is saved over that necessary if the entire mass of lower fatty acid, acid anhydride and cellulose were cooled in the mixer before the addition of the catalyst to cause the esterification to occur. This saving of time has been found to amount to as much as 2 hours in practical operation, thus measurably speeding up the process.

The following examples illustrate my invention employed in the preparation of both cellulose acetate and the mixed fatty acid esters of cellulose:

*Example I*

400 pounds of refined cotton linters were treated with a mixture of 1200 pounds of acetic acid and 800 pounds of propionic acid for 4 hours at 100° F. In the meantime a mixture of 545 pounds of 90% propionic anhydride, 800 pounds of 85% acetic anhydride, 740 pounds of propionic acid and 7200 c. c. of sulfuric acid was prepared and refrigerated to a temperature of approximately 10° F. After the presoaking of the cellulose, this mass was cooled to about 60° F. and the refrigerated mixture was added thereto. The water jacket surrounding the reaction vessel was maintained at a temperature of approximately 40° F. at the first part of the esterification. The temperature did not rise above 80° F. during the entire esterification. At the end of about 8 hours, the cellulose, which was esterified had all gone into solution resulting in a dope of very high viscosity.

The ester prepared in this manner was soluble in acetone and in ethylene chloride. If desired, the ester may be hydrolyzed, for instance by adding 1000 pounds of 50% acetic acid and keeping the solution at 100° F. for the time desired, such as about 14 hours, as described in Malm and Fletcher Patent No. 2,026,583.

*Example II*

The preceding example was repeated except that butyric acid and butyric anhydride were employed in the same proportions as the propionic acid and propionic anhydride. At the end of 8 hours, the esterification was completed and the ester had gone into solution resulting in a dope of very high viscosity.

*Example III*

450 pounds of cotton linters were presoaked with 3100 pounds of acetic acid for 4 hours at approximately 100° F. In the meantime a mixture of 1400 pounds of acetic anhydride and 8000 c. c. of sulfuric acid was prepared and refrigerated to approximately 0° F. The presoaked cellulose was cooled down to about 70° F. whereupon the refrigerated mixture was added thereto, the cooling jacket being maintained at approximately 40° F. during the first part of the esterification. At the end of approximately 6 hours, the resulting cellulose acetate had completely dissolved resulting in a cellulose acetate solution of high viscosity.

The cellulose acetate was then hydrolyzed by adding 1000 pounds of 50% acetic acid to the mass and maintained at 100° F. until acetone solubility was reached.

*Example IV*

450 pounds of cotton linters were mixed with 1500 pounds of propionic acid, 500 pounds of acetic acid and 25 pounds of water and allowed to stand for 4 hours at 100° F. In the meantime a mixture of 1300 pounds of 90% propionic anhydride, 450 pounds of acetic anhydride, 750 pounds of propionic acid and 8000 c. c. of sulfuric acid was prepared and refrigerated to a temperature of about 10° F. The presoaked cotton was cooled to about 50° F. and the refrigerated mixture was added thereto whereupon esterification occurred. After a period of about 6 hours, the cellulose had completely esterified and a clear highly viscous solution was obtained. The cellulose acetate propionate formed may be hydrolyzed, for instance, by adding 1000 pounds of 50% acetic acid to the dope and allowing it to stand at 100° F. for the time desired.

Not only do the esters prepared in accordance with the present invention exhibit a high viscosity in the esterification mixture, but in addition, they exhibit a high acetone viscosity which is an indication of their value for the preparation of sheeting. These esters when coated out, such as from acetone or ethylene chloride, will give sheeting having a high flexibility which is valuable for various commercial purposes.

The various temperatures which have been specified herein, may be varied within limits without departing from the present invention, depending to some extent on the viscosity desired in the product. Also the temperature of cooling the presoaked cellulose need not be so low if compensated for by the temperature to which the other ingredients are cooled. Although the temperature of 0°–10° F. has been specified as a satisfactory temperature for the reaction ingredients, nevertheless these materials may be cooled to still lower temperatures, such as below 0° F. or to higher temperatures, such as 20° or even 30° F. Obviously with a temperature of 30° F., the reaction temperature will not be as easily controllable and the viscosity will not be as low as where the temperature is lowered to, for instance, 10° F., although if the moisture in the acetic acid and cellulose is removed, such as by conversion to acetic acid, as described and claimed in my application Serial No. 526,121, the amount of heat generated when these esterification ingredients are added will not be as great, so that the temperatures need not be so low to compensate for the heat generated.

Although it is preferred that the mixture of cellulose and acetic acid resulting from the presoaking be cooled to approximately 65° F.–70° F. prior to the addition of the esterification ingredients to give the maximum cooling effect, nevertheless temperatures above 70° have been found to be satisfactory in many cases. If temperatures higher than 70° F. are used, they must be compensated for by correspondingly lower temperatures of the anhydride and catalyst, if an extremely high viscosity product is desired. Although a cooling jacket temperature of, for the first part of the esterification, 40° has been specified, this temperature control may also be varied in accordance with the other conditions prevailing and the product which is desired. The present invention gives the operator a tool by which he may regulate cellulose esterification processes to obtain a product in the high viscosity range approximating the viscosity desired.

In the preparation of the high viscosity esters, variations may be made in the ingredients of the esterification bath. Wood pulp, for instance, especially of a highly refined nature, may be employed instead of cotton linters or cotton as the starting material. Also, the amount of catalyst employed can be somewhat increased or reduced, although, a comparatively high quantity of catalyst is used to obtain the most satisfactory results. It is preferred in these processes that the volume of liquid in the esterification bath be large enough compared with the weight of the cellulose, so that a flowable dope which can be readily handled is obtained, such as at least 8 parts of liquid to 1 part of cellulose, although it may be possible under extremely favorable conditions to prepare high viscosity esters using a less volume of liquid to which cases the present invention could of course be adapted.

The viscosity of the ester present in the reaction mixture, after the completion of the esterification, may for instance be determined in terms of the acetic acid-tetrachlorethane viscosity thereof. This is a well-known method of determining viscosity in which equal volumes of acetic acid and tetrachlorethane are mixed with a completed reaction mixture and the relative viscosity of the resulting solution is determined.

The esters prepared by processes which embody the present invention are especially valuable for forming sheets of high flexibility which may be employed in the manufacture of photographic film, thin sheeting and the like, yarn, laminated glass or other laminated or re-enforced materials.

I claim:

1. A process for making high viscosity lower fatty acid esters of cellulose which comprises presoaking one part of cellulose in approximately five parts of a lower fatty acid bath containing acetic acid at 100° F. and subsequently esterifying the presoaked cellulose by adding thereto a refrigerated esterifying liquid comprising approximately 3.36 parts of lower fatty acid anhydride and sufficient acylation catalyst to promote the esterification, which liquid has a temperature of 0° F.–30° F., the temperature of the esterification mass being not allowed to exceed 90° F.

2. A process for preparing high viscosity lower fatty acid esters of cellulose which comprises presoaking one part of cellulose in approximately five parts of a mixture of acetic acid and lower fatty acid having 3–4 carbon atoms at 100° F. and subsequently esterifying the presoaked cellulose by adding thereto a refrigerated esterifying liquid comprising approximately 3.36 parts of lower fatty acid anhydride and sufficient acylation catalyst to promote the esterification, which liquid has a temperature of approximately 10° F., the temperature of the esterification mass being not allowed to exceed 90° F.

CARL J. MALM.